(12) United States Patent
Sankaran et al.

(10) Patent No.: US 11,443,376 B2
(45) Date of Patent: Sep. 13, 2022

(54) END-TO-END DEAL EXECUTION SYSTEM AND METHOD

(71) Applicant: JPMORGAN CHASE BANK, N.A., New York, NY (US)

(72) Inventors: Ashokkumar Sankaran, Sugar Land, TX (US); Philip Greaves, Hampshire (GB); Xiaochun Xing, Bromley (GB); Bret Goldsmith, Sugar Land, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 134 days.

(21) Appl. No.: 16/885,649

(22) Filed: May 28, 2020

(65) Prior Publication Data

US 2021/0374850 A1   Dec. 2, 2021

(51) Int. Cl.
*G06F 9/54* (2006.01)
*G06Q 40/04* (2012.01)
*H04L 5/00* (2006.01)

(52) U.S. Cl.
CPC ............ *G06Q 40/04* (2013.01); *G06F 9/542* (2013.01); *G06F 9/546* (2013.01); *H04L 5/0032* (2013.01)

(58) Field of Classification Search
CPC .......... G06F 9/4812; G06F 9/54; G06F 9/541; G06F 9/542; G06F 9/546; G06F 9/547
USPC ........................................ 719/313, 318, 328
See application file for complete search history.

(56) References Cited

U.S. PATENT DOCUMENTS

| | | | |
|---|---|---|---|
| 2008/0301124 A1* | 12/2008 | Alves | G06F 16/2453 |
| 2009/0070786 A1 | 3/2009 | Alves | |
| 2009/0292759 A1 | 11/2009 | Piper | |
| 2015/0161214 A1 | 6/2015 | Kali et al. | |
| 2019/0179716 A1 | 6/2019 | Park et al. | |
| 2019/0317776 A1* | 10/2019 | Walsh | G06N 20/00 |
| 2021/0263735 A1* | 8/2021 | Harishankar | G06F 8/36 |

OTHER PUBLICATIONS

International Search Report issued from the International Search Authority in related International Application No. PCT/US21/31251, dated Aug. 10, 2021, pp. 1-8.

* cited by examiner

*Primary Examiner* — Andy Ho
(74) *Attorney, Agent, or Firm* — Greenblum & Bernstein, P.L.C.

(57) ABSTRACT

The invention relates to a computer-implemented system and method for end-to-end deal execution for primary issuance of securities in equity capital markets and debt capital markets. The system may comprise: a user interface layer that is programmed to execute a unidirectional data flow; a connectivity layer that is programmed to provide scalable, low latency data streaming across a plurality of channels, regions and users and that utilizes a protocol buffer for data streaming; a data access layer that utilizes an in-memory data grid to distribute processing of the requests to a plurality of processors; a microservices layer that is programmed to provide modular microservices that subscribe to events published by the data access layer and that use a command query responsibility segregation (CQRS) pattern; a database layer; and a plurality of external application programming interfaces (APIs) to enable data exchange with third parties.

20 Claims, 4 Drawing Sheets

END-TO-END DEAL EXECUTION SYSTEM AND METHOD

FIELD OF THE INVENTION

The present invention relates generally to systems and methods for deal execution, and more particularly to a system and method for end-to-end deal execution for primary issuances of securities.

BACKGROUND

Investment banks commonly serve as underwriters for primary issuances of securities in equity capital markets and debt capital markets. In an initial public offering (IPO), for example, the investment bank representing the company issuing securities begins by contacting potential investors regarding the quantity and price of shares that the investor would be willing to purchase. The process of compiling such information and commitments from potential investors, referred to as book building, enables the investment bank to appropriately price the securities and manage the risks involved in the issuance.

The book building process conducted by the investment bank involves the exchange and analysis of large amounts of financial data from many sources, particularly when multiple investment banks are involved in a syndicated offering. The financial data may include, for example, numerous orders for securities that are being received by the investment banks. Furthermore, when traders at multiple investment banks are competing with each other to fulfill orders, the timely availability of information can provide a significant advantage to a trader. For example, if an IPO is in an open state, and an investment bank is competing with a syndicate of other banks to fulfill orders for securities, current information can be the difference between a particular trader fulfilling the order and losing the order. In addition to book building, the issuance of new securities involves related processes such as allocation, reconciliation, pricing, billing, and delivery of new issues. As with book building, these processes also require the transmission, analysis, and storage of large amounts of data from multiple locations.

Known systems, however, are not designed to provide real time or near real time access to critical data for investment banks in the issuance of new securities. Delays in existing systems are caused in part by system architectures that are not designed for near real time updates or for scalability, and also by the large amounts of data exchanged in larger, syndicated offerings. It would be desirable, therefore, to have a system and method for end to end deal execution that could overcome these and other drawbacks in known systems.

SUMMARY

According to one embodiment, the invention relates to a computer-implemented system and method for end-to-end deal execution for primary issuance of securities in equity capital markets and debt capital markets. The system may include a plurality of modules or layers comprising at least one memory and at least one computer processor. According to one embodiment, the system comprises: a user interface (UI) layer providing a user interface to users of the system that is programmed to execute a unidirectional data flow; a connectivity layer that is programmed to provide scalable, low latency data streaming across a plurality of channels, regions and users and that utilizes a protocol buffer for the data streaming; a data access layer that processes requests from the connectivity layer in a multi-threaded, multi-process configuration, and that utilizes an in-memory data grid to distribute processing of the requests to a plurality of processors; a microservices layer that is programmed to provide modular microservices, wherein the modular microservices subscribe to events published by the data access layer and the modular microservices update the data access layer once event execution is completed, wherein the modular microservices use a command query responsibility segregation (CQRS) pattern; a database layer that is programmed to store and provide data to the data access layer; and a plurality of external application programming interfaces (APIs) that are configured to exchange data with third parties including a regulatory agency and a third party financial information provider.

The invention also relates to a computer implemented method for end-to-end deal execution for primary issuance of securities, and to a computer readable medium for end-to-end deal execution for primary issuance of securities.

The end-to-end deal execution system can provide a number of advantages to an investment bank and its traders. For example, it can provide data with low latency and high reliability as well as asynchronous and concurrent data services. The system can provide scalable, back-end services supporting parallel development. The UI layer can handle streaming data, and it can enable component-based development of the UI, which supports reusability and quality. The UI layer can also provide a consistent data traverse pattern for sending and receiving data from UI elements and a highly efficient UI payload transfer mechanism.

Other advantageous functionalities include the ability to allow internal users across regions to conduct book building, reconciliation, allocation, pricing, billing, and delivery of new issues of securities. Other functionalities include real-time book sharing across other banks and a customized order management interface for the bank's product sales force. According to an exemplary embodiment, the system architecture is designed so that the system and method are robust and can be scaled across different regions with high availability for large numbers of users. Other advantageous features include a unidirectional data flow pattern, a reactive and conflation design pattern to support UI stream updates, payloads using a protocol buffer, use of low latency universal messaging functionality, and a server side designed using microservices. These and other advantages will be described further in the detailed description below.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Figure 1:
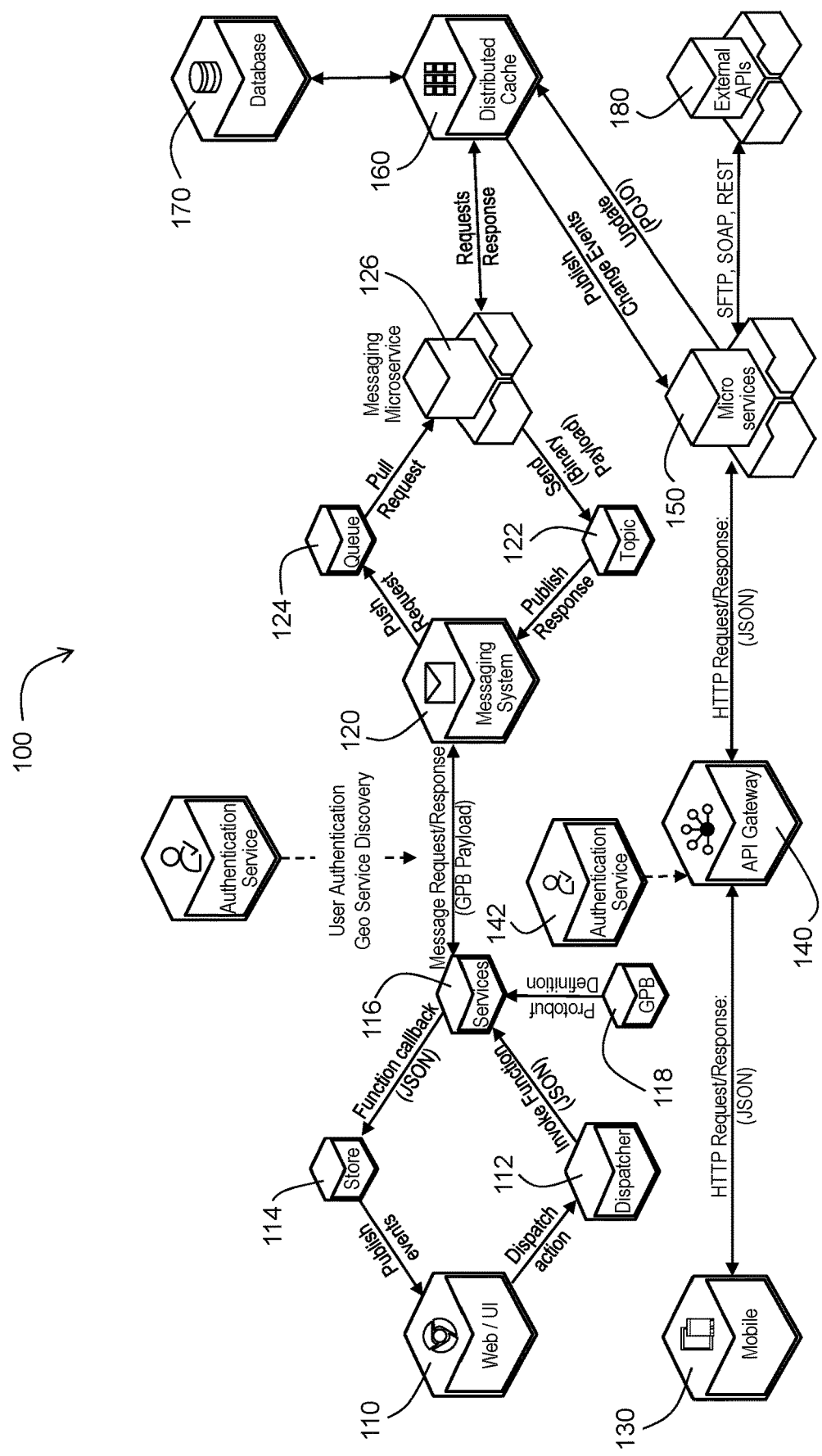
FIG. 1 illustrates an example of a system architecture for a deal execution system according to an exemplary embodiment of the invention.

Referring to the drawings, FIG. 1 illustrates an example of a system architecture for a deal execution platform according to an exemplary embodiment of the invention. As shown in FIG. 1, the system 100 comprises a number of components or layers, including a user interface (UI) layer 110, a connectivity layer 120, a mobile layer 130, an application programming interface (API) gateway 140, a microservices layer 150, a data access layer 160, a database layer 170, and external APIs 180.

The UI layer 110 allows a user, such as a trader at an investment bank, to enter relevant deal information and to access and analyze relevant deal information in real time or near real time. The relevant deal information may include data representing a syndicated view of book building across a plurality of investment banks which may have trade updates with a frequency of thousands per minute. According to one embodiment, the UI layer provides an optimized message delivery technique to avoid duplicates, to avoid destabilization due to overload, and to keep data viewed in real time, giving the traders an advantage over other underwriters as they would have the latest booking information immediately available.

According to one embodiment, the UI layer 110 comprises a web application built with HTML5, Web Components from the Polymer Project, and a unidirectional data flow according to the Redux architecture. Web Components may comprise a set of APIs that allow a web application to interface with multiple browsers. Polymer is an open source library for creating and using web components with a set of polyfills for common browsers. Redux is a predictable state container for Javascript apps that facilitates writing applications that behave consistently and that run in different environments. The Redux architecture provides a unidirectional data flow such that all data in an application follows the same lifecycle pattern.

In the UI layer 110, according to one embodiment, Polymer is used as a helper framework to standardize the UI and to build reusable custom elements. Additionally, Redux is also used to manage data flow and mutation across the application to ensure consistency and accuracy, according to one embodiment.

According to one embodiment, the design structure of the messaging service 120 implements a singular path for updates to get to the UI 110 from the original data source in the distributed cache 160, and for updates to go from the UI 110 to the backend services (i.e., messaging microservices 126), without competition from various UI elements if there is concurrent activity. This configuration simplifies the code while optimizing the communication from web UI 110 to messaging microservice 126 as it avoids numerous parallel flows of information, instead aggregating such information together when there are multiples updates to be done (which is the responsibility of the messaging system 120).

According to one embodiment, each element in the system 100 that needs access to the data is bound, directly or indirectly, to a sub-tree of the application state tree. According to a preferred embodiment, two-way data binding is not used to send data up, from child to parent, so only parent elements send data to children using one-way data binding. Child elements, in turn, send the events (e.g., emit actions) responding to user actions, indicating that the data may need to be modified. Special non-visual elements called action dispatchers 112 mutate the data, then all elements listening to the data changes render new data.

According to one embodiment, modern architecture models can be used with the UI layer 120, such as Google's Progressive Web Apps, HTTP/2, Google's Service Worker, as well as features built into the browser platform. Reusable components can be designed as a monorepo (monolithic repository) project managed by Lerna Tool and published to an internal repository, as one example.

According to a preferred embodiment, payloads between the UI layer 110 and the microservices layer 126 are transported in high-compressed, bandwidth-efficient, protocol buffer format via a low-latency message service. Protocol buffers 118, such as Google Protobuf, comprise a language-neutral, platform neutral, extensible mechanism for serializing structured data.

The messaging service provided by the connectivity layer 120 can provide message delivery across public, private and wireless infrastructures. According to a preferred embodiment, universal messaging is provided to solve the challenges of delivering data across different networks. Universal messaging can provide its guaranteed messaging functionality without the use of a web server or modifications to a firewall policy. The connectivity layer 120 provides robust communication services between the UI layer 110 and other service layers using the Nirvana Universal Messaging System, according to one embodiment. The Nirvana Universal Messaging System provides high-performance, low-latency real-time data streaming across multiple channels with the ability to scale without limits which allows the system 100 to run across regions and large number of users.

The Nirvana Universal Messaging System, upon receiving requests from the UI layer 110, pushes them into a queue 124 waiting to be processed by the messaging microservice 126. Once requests get processed, the messaging microservice 126 sends responses as a binary payload to a topic 122, and they get published to their respective message channels.

The mobile layer 130 comprises a mobile software application ("mobile app") designed to run on a mobile device such as a smartphone or tablet to provide functionality similar to the UI layer 110. The mobile layer 130 communicates with the API gateway 140 via an HTTP request/response protocol which may be in JavaScript object notation (JSON) according to one embodiment. The mobile layer 130 allows a user such as a trader to access, transmit, and analyze the same information as the UI layer 110, but using a mobile device such as a smart phone or tablet computer.

The API gateway 140 may comprise a representational state transfer (REST) API layer to process requests and provide data to the mobile layer 130. The API gateway 140 validates and authorizes incoming requests using the authentication service 142. The API gateway 140 also interacts with the microservices layer 150 to process and retrieve data in the data access layer 160. According to a preferred embodiment, the API gateway 140 communicates with the microservices layer 150 in an HTTP request/response format using JSON.

The microservices layer 150 provides various services that support the system's features and business requirements. The microservices in the microservices layer 150 subscribe to events published by the data access layer 160. The microservices also update the data access layer once event execution is completed. According to one embodiment, the updates are provided in plain old Java objects (POJO) format.

The service pathway denoted by 130 to 140 to 150 in FIG. 1 represents an alternative flow, other than what the traders require, for clients such as the issuers, specifically getting to the same data, but doing so in a way that isolates the trader UI 110 and performance requirements, thus allowing for separate scalability and resiliency profiles.

In the microservices layer 150, server-side services can be implemented using a modular configuration, where service components may be small, independent and easily scaled up and out. According to one embodiment, the microservices are designed with an event-driven model using the Command Query Responsibility Segregation (CQRS) pattern. This architecture enables the system to support high-frequency requests, scalability, availability, and security. The CQRS pattern can be used to synchronize data from other services for searching functionality. Many of the mobile API services use the CQRS pattern to service the client request. The CQRS pattern will be described further below in connection with FIG. 2.

The data access layer 160 processes requests from the connectivity layer 120 in a multi-threaded, multi-process fashion to increase throughput and reduce overall process time. In the data access layer 160, according to one embodiment, a distributed cache platform using an in-memory data grid (IMDG) is used to enhance performance and scalability for data access. An IMDG is a data structure that resides in random access memory (RAM), rather than on a hard drive or other memory device. The IMDG can be used to store large amounts of data in RAM and to distribute it across multiple nodes in a network, which can significantly increase processing speed. According to one embodiment, the IMDG is the Hazelcast In-Memory Data Grid. The Hazelcast IMDG provides a unified process for data access enabling parallel execution, allowing the application to treat data sources as interchangeable, and provides significant improvements to application speed and scalability.

According to one embodiment, the database layer 170 comprises a relational database management system (RDBMS), such as Oracle's RDBMS. The RDBMS is used to store and provide application data to the data access layer 160 according to one embodiment of the invention. Both a write through model and a write aside model can be used to persist the data in the database layer 170.

The system 100 provides external APIs 180, as shown in FIG. 1. According to one embodiment, the system utilizes several external services through SFTP, SOAP, and REST to exchange data for market connectivity and feed data to external recipients for regulatory requirements. Some examples of external services may include IssueNet for synchronizing book-building state to other underwriters in the deal and FINRA for sending final deal allocations to the regulators. The external APIs 180 may be used with the messaging microservices 150 and are designed to comport with requirements by external services (e.g., Secure File Transfer Protocol requirement for facilitating data access and data transfer).

Figure 2:
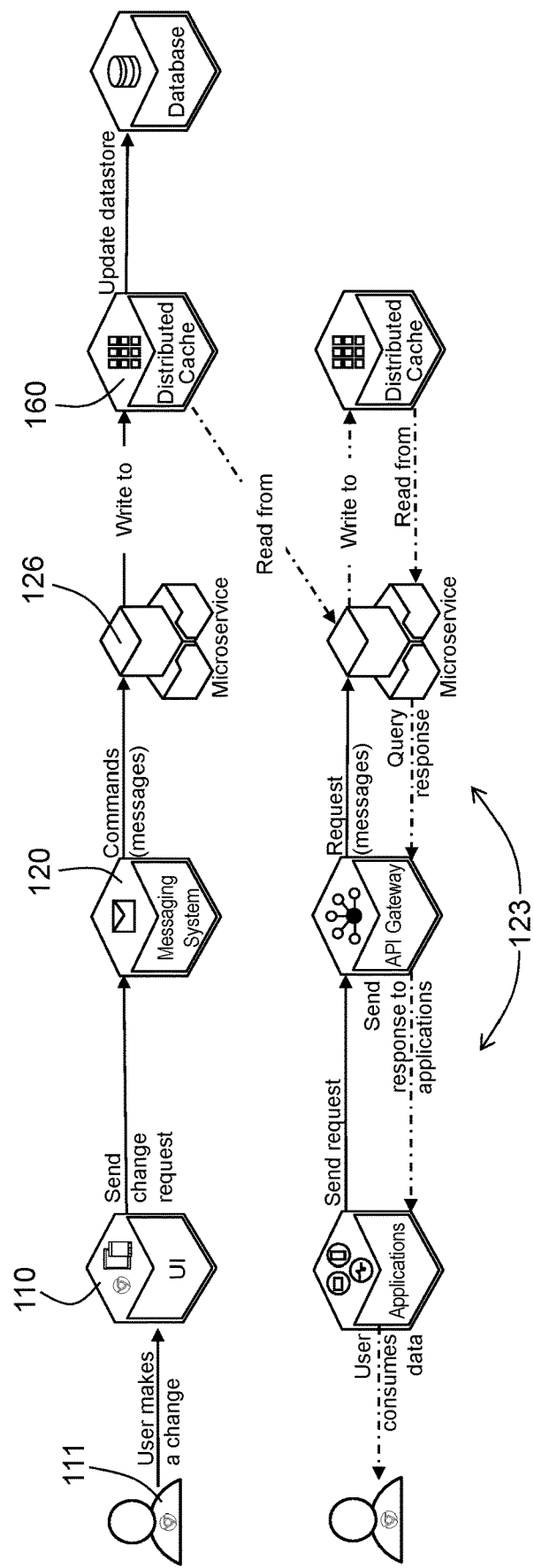
FIG. 2 is a diagram illustrating the process followed by one or more of the querying services in the deal execution system of FIG. 1.

FIG. 2 is a diagram illustrating the process conducted by one or more of the querying services in the deal execution system 100, such as Mobile UI, Dashboards, Analytics, and Monitoring which may constitute secondary UIs that are primarily read-only on the inner datasets, where the users are different from the traders. These users may include issuers, external sales, and the client-facing bankers. According to one embodiment, these querying services are designed using a Command Query Responsibility Segregation (CQRS) implementation. FIG. 2 illustrates an example of a microservice architecture that utilizes the principles of CQRS. A core tenet of CQRS is the concept of an architectural division between the use cases of data acquisition and data alteration. CQRS is an architectural pattern that separates reading and writing into two different models. A process is either a command that performs an action or a query that returns data. A command does not return data and a query does not change the data.

As shown in FIG. 2, a user 111 making a change to the data via the user interface layer 110 will issue a command through the messaging system 120 to the microservices 126 on the back-end, which will write to a distributed cache 160 that acts as a source of truth for a concurrent set of microservices. These microservices will use this information in a separate pathway 123 through which a user is able to query for information and obtain a response. One advantage of this architecture over one which comingles the two data pathways is both the amelioration of needless complexity problems arising from the need to reconcile domain models between different layers of the application, as well as a performance benefit for high traffic applications due to the ability to individually scale pathways for reads as opposed to writes. This allows for less complexity and better performance when facing issues with complex domain models. FIG. 2 highlights the read-optimized view that is maintained outside the normal flow of the 110-160 sequence, which is otherwise write optimized and scaling at a different level.

Figure 3:
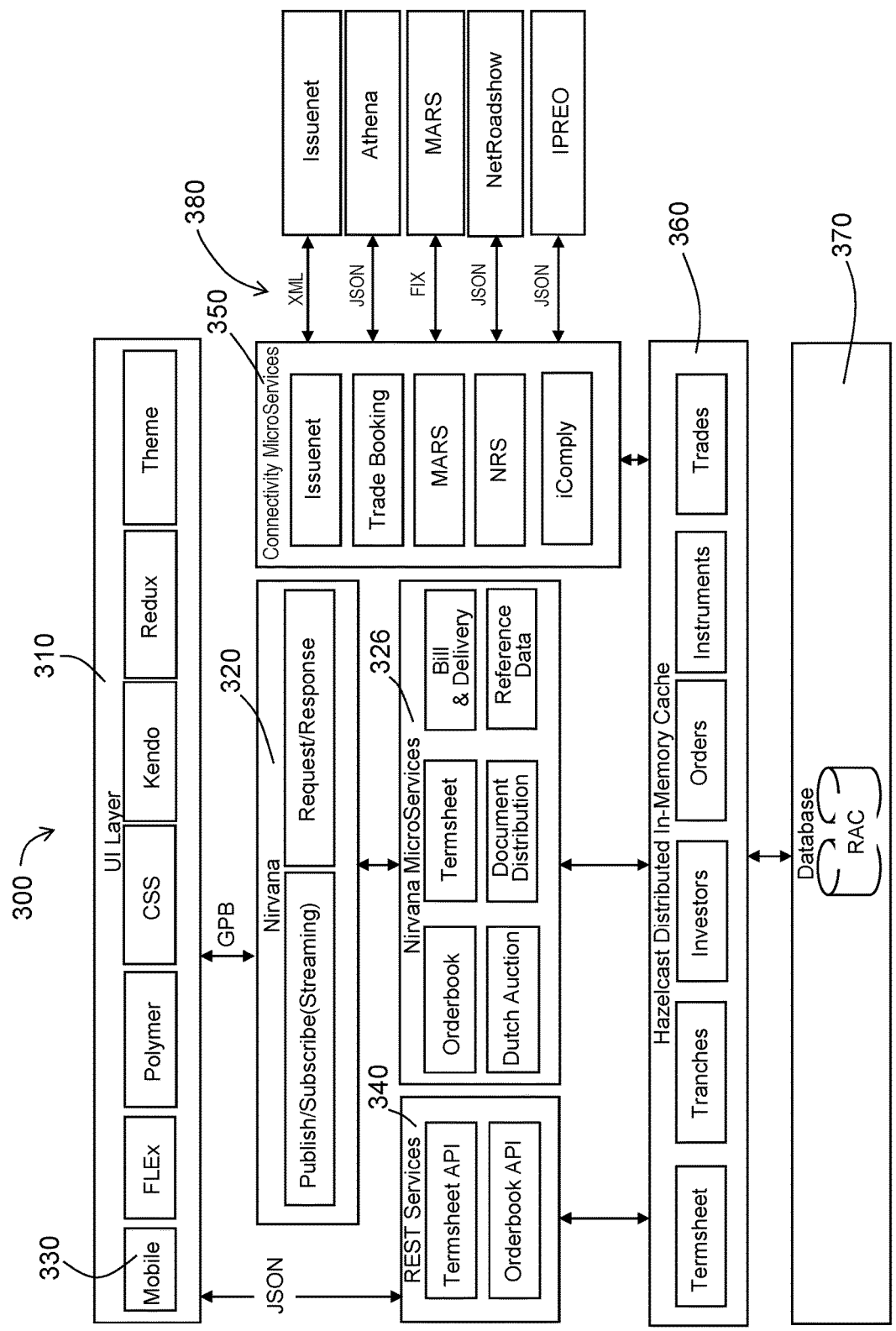
FIG. 3 is a block diagram of a deal execution system according to another embodiment of the invention.

FIG. 3 is a block diagram of an end-to-end deal execution system according to another embodiment of the invention and represents a component view of FIG. 1. As shown in FIG. 3, the system 300 includes a UI layer 310, a connectivity layer 320, a microservices layer 326, a mobile layer 330, an API gateway 340, a connectivity microservices layer 350, a distributed cache 360, a database layer 370, and an external API layer 380.

The UI layer 310 provides an interface for users to access the system 300 and may include functionalities such as the mobile layer 330, FLEx, Web Components from the Polymer Project, Cascading Style Sheets (CSS), Kendo Javascript UI components, a Redux architecture, and Theme. Cascading Style Sheets (CSS) is a markup language that controls the appearance of HTML elements on a webpage. Kendo JavaScript UI components provide a framework for modern web and mobile apps with HTML5 and JavaScript. As illustrated in FIG. 3, the UI processes communication with the back end via optimized updates through the messaging layer.

The connectivity layer 320 may include a Nirvana universal messaging system enabling users to publish and subscribe to data streams, as well as request/response functionality. The connectivity layer uses a protocol buffer such as Google protocol buffer (GPF) to transmit and receive data from the UI layer 310.

The microservices layer 326 may provide a number of microservices relating to orderbooks, Dutch auctions, term sheets, document distribution, bill and delivery services, and reference data.

The API gateway 340 allows the mobile layer 330 to interface with the distributed cache 360.

The connectivity microservices 350 may include functionalities to interface with third party services via external APIs 380. Such third party services may include, for example, Issuenet, Athena Trade Booking, MARS, NetRoadshow (NRS), and iComply by IPREO. The connectivity microservices 350 also interface with the distributed cache 360.

The distributed cache 360 may store data relating to term sheets, tranches of securities, investors, orders for securities, securities instruments, and trades, for example.

The database 370 may be a relational database management system from Oracle, for example, that comprises real application clusters (RAC), according to one embodiment.

Figure 4:
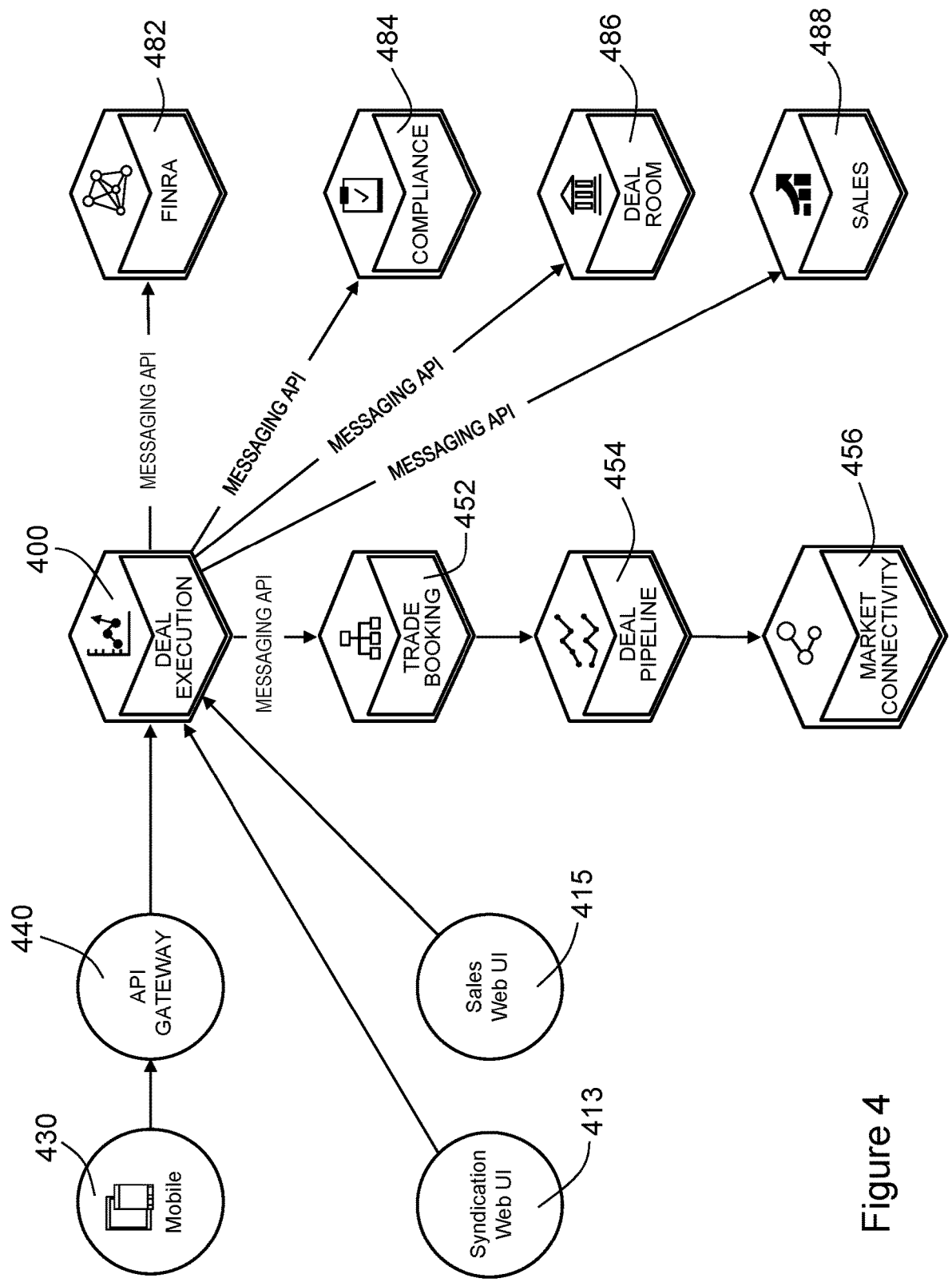
FIG. 4 is a diagram of data flows for a deal execution system according to an exemplary embodiment of the invention.

FIG. 4 is a diagram of data flows to and from a deal execution system according to an exemplary embodiment of the invention and further elaborates on different external connectivity. As shown in FIG. 4, the deal execution system 400 is in communication with a number of other systems and modules. For example, a mobile layer 430 is provided to enable a user such as a trader to communicate with the system 400 via a mobile device such as a smart phone or tablet computer. The mobile layer 430 may communicate via HTTP requests and responses using JSON with the API gateway 440. The API gateway 440 communicates via HTTP requests and responses using JSON with microservices within the deal execution system 400.

The deal execution platform 400 is also accessible via a syndication web UI 413 and a sales web UI 415. Once the deal is announced, the underwriter posts the deal prospectus. The deal notification and material is distributed to a superset of investors. Sales using Sales Web UI enters investors Indications Of Interest (IOI), which represent interest at pricing levels. Syndication web UI is used by the syndicate desk where they monitor, edit and allocate (e.g., distribute the bonds across the orders in accordance with the issuer) the investor's IOI orders.

The deal execution platform 400 includes a messaging API to interface with other systems, including a trade booking system 452, a deal pipeline system 454, and a market connectivity system 456. The trade booking system is used by the bill and deliver bank to execute trades for selling the bond from the issuer to the investor at the agreed price. The deal pipeline system captures the issuer's interest to raise capital in the debt/equity capital markets. It is also used for deal tracking and revenue reporting to business and product management on a need-to-know basis.

The deal execution platform 400 includes messaging APIs to interface with third party systems, including a system 482 operated by a regulatory agency such as the Financial Industry Regulatory Authority, Inc. ("FINRA"), a compliance system 484, a deal room system 486, and a sales system 488. For purposes of the FINRA trade reporting rules, eligible transaction distributions need to be reported. The deal room system allows issuers and underwriting banks to discuss deal progress with reference to the same information, and avoids the banks having to send regular updated excel spreadsheets and order updates to issuers. Bankers uses the trend line reports to communicate to the issuers and guide them according to the market demand. The sales system is where sales places orders or best offer (OBO) investors Indications Of Interest (IOI). Sales updates the orders as per the investor directions.

The end-to-end deal execution system can provide a number of advantages to an investment bank and its traders. For example, it can provide data with low latency and high reliability, as well as asynchronous and concurrent data services. The system can provide scalable, back-end services supporting parallel development. The UI layer can handle streaming data, and it can enable component-based development of the UI, which supports reusability and quality. The UI layer can also provide a consistent data traverse pattern for sending and receiving data from UI elements and a highly efficient UI payload transfer mechanism.

Other advantageous functionalities include the ability to allow internal users across regions to do book building, reconciliation, allocation, pricing, billing, and delivery of new issues. Other functionalities include real-time book sharing across other banks, and a customized order management interface for the bank's product sales force. According to one embodiment, the system architecture is designed to ensure that the application is robust and can be scaled across different regions with high availability for large numbers of users. Other advantageous features include a unidirectional data flow pattern, a reactive and conflation design pattern to support UI stream updates, payloads using a protocol buffer, use of low latency universal messaging functionality, and a server side built using microservices.

Although the deal execution system has been described in connection with primary issuances of securities in debt capital markets and equity capital markets, the system can be utilized for other types of financial markets and products, such as leveraged finance loans and fixed income securities such as high yield bonds, high grade bonds, government bonds, SSA bonds, and similar products Those skilled in the art will appreciate that the system diagrams discussed above are merely examples of a deal execution platform configuration and are not intended to be limiting. Other types and configurations of networks, servers, databases and personal computing devices (e.g., desktop computers, tablet computers, mobile computing devices, smart phones, etc.) may be used with exemplary embodiments of the invention. Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Data and information maintained by the servers and personal computers described above may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

The communications networks described above may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, an Asynchronous Transfer Mode (ATM) connection, a Fiber Distributed Data Interface (FDDI) connection, a Copper Distributed Data Interface (CDDI) connection, or an optical/DWDM network.

The communications networks described above may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Bluetooth radio link, or an IEEE 802.11-based radio frequency link. The communications network may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

Although examples of servers and personal computing devices are shown in the figures, exemplary embodiments of the invention may utilize other types of communication devices whereby a user may interact with a network that transmits and delivers data and information used by the various systems and methods described herein. The personal computing device may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device. The personal computing devices may include various connections such as a cell phone connection, WiFi connection, Bluetooth connection, satellite network connection, and/or near field communication (NFC) connection, for example.

The servers and personal computing devices described above may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices in the figures may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, dBase, Forth, HTML, Android, iOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented system for deal execution for issuance of securities, the system including a plurality of layers comprising at least one memory and at least one computer processor programmed with software, the system comprising:

a user interface layer, a connectivity layer, a data access layer, a microservices layer, and a database layer;

the user interface layer providing a user interface to users of the system that is programmed to execute a unidirectional data flow, user interface read operations pull updates from the database layer via the data access layer through the microservices layer and the connectivity layer in a first pathway, and user interface command actions to change data flow through the connectivity layer and microservices layer to the data access layer which writes that data change to the distributed cache in a second pathway;

the connectivity layer is programmed to provide data streaming across a plurality of channels, regions and users and that utilizes a protocol buffer for the data streaming, the protocol buffer compressing the data stream;

the data access layer processes requests from the connectivity layer in a multi-threaded, multi-process configuration, and that utilizes an in-memory data grid to distribute processing of the requests to a plurality of processors;

the microservices layer is programmed to provide modular microservices, wherein the modular microservices subscribe to events published by the data access layer and the modular microservices update the data access layer once event execution is completed, wherein the modular microservices are designed with an event-driven model using a command query responsibility segregation (CQRS) pattern;

the database layer is programmed to store and provide data to the data access layer; and a plurality of external application programming interfaces (APIs) that are designed to exchange data with third parties including a regulatory agency and a third party financial information provider.

2. The computer-implemented system of claim 1, wherein the user interface layer comprises one or more reusable components designed as a monolithic repository project.

3. The computer-implemented system of claim 2, wherein the one or more reusable components are published to an internal repository.

4. The computer-implemented system of claim 1, wherein one or more payloads between the user interface layer and the microservices layer are transported in a protocol buffer format via a low-latency message service.

5. The computer-implemented system of claim 1, wherein the connectivity layer provides message delivery across public, private and wireless infrastructures using a universal messaging scheme to deliver data across different networks.

6. The computer-implemented system of claim 1, further comprising a mobile layer in communication with one or more API gateways.

7. The computer-implemented system of claim 6, wherein the mobile layer comprises a mobile software application to run on one or more mobile devices.

8. The computer-implemented system of claim 6, wherein the one or more API gateways comprise a representational state transfer API for processing requests and providing data to the mobile layer.

9. The computer-implemented system of claim 1, wherein one or more updates to the data access layer are provided by the microservices layer in a Plain Old Java Objects (POJO) format.

10. The computer-implemented system of claim 1, wherein the database layer comprises a relational database management system.

11. A computer-implemented method for deal execution for issuance of securities, the method comprising:

providing a user interface programmed for executing a unidirectional data flow, user interface read operations pull updates from a database layer via a data access layer through a microservices layer and a connectivity layer in a first pathway, and user interface command actions to change data flow through the connectivity layer and microservices layer to the data access layer which writes that data change to the distributed cache in a second pathway;

providing, using the connectivity layer, data streaming across a plurality of channels, regions and users, utilizing a protocol buffer for the data streaming the protocol buffer compressing the data stream;

processing, using the data access layer, requests from the connectivity layer in a multi-threaded, multi-process configuration, utilizing an in-memory data grid for distributing processing of the requests to a plurality of processors;

subscribing to events published by the data access layer and updating the data access layer once event execution is completed, using a modular microservices layer designed with an event-driven model using a command query responsibility segregation (CQRS) pattern;

storing and providing data to the data access layer, using a database layer; and exchanging data with plurality of third parties including a regulatory agency and a third party financial information provider, using a plurality of external application programming interfaces (APIs).

12. The computer-implemented method of claim 11, further comprising implementing the user interface layer with one or more reusable components designed as a monolithic repository project.

13. The computer-implemented method of claim 12, further comprising publishing the one or more reusable components to an internal repository.

14. The computer-implemented method of claim 11, further comprising transporting one or more payloads between the user interface layer and the microservices layer in a protocol buffer format via a low-latency message service.

15. The computer-implemented method of claim 11, further comprising communicating with one or more API gateways using a mobile layer.

16. The computer-implemented method of claim 15, further comprising implementing the mobile layer with one or more mobile software applications to run on one or more mobile devices.

17. The computer-implemented method of claim 15, further comprising implementing the one or more API gateways with a representational state transfer API for processing requests and providing data to the mobile layer.

18. The computer-implemented method of claim 11, further comprising providing message delivery across public, private and wireless infrastructures using a universal messaging scheme for delivering data across different networks.

19. The computer-implemented method of claim 11, further comprising implementing the database layer using a relational database management system.

20. A computer-implemented method for deal execution for issuance of securities, comprising:

establishing a first service pathway between a user interface layer and a microservice layer for providing one or more updates from a data source in an in-memory data grid to the user interface layer, the one or more updates travelling from the microservice layer through a messaging layer to the user interface; and establishing a second service pathway, distinct from the first service pathway, between the user interface layer and the microservice layer for providing one or more updates from the user interface layer to the in-memory data grid via one or more payloads using a protocol buffer to compress the one or more payloads, the one or more updates travelling from the user interface through the messaging layer to the microservice layer, wherein the second service pathway comprises one or more action dispatchers which mutate one or more data elements in response to the one or more updates from the user interface layer.

\* \* \* \* \*